(12) United States Patent
Jiang et al.

(10) Patent No.: US 12,477,129 B2
(45) Date of Patent: Nov. 18, 2025

(54) VIDEO CONFERENCING BASED ON ADAPTIVE FACE RE-ENACTMENT AND FACE RESTORATION

(71) Applicant: TENCENT AMERICA LLC, Palo Alto, CA (US)

(72) Inventors: Wei Jiang, Sunnyvale, CA (US); Wei Wang, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 750 days.

(21) Appl. No.: 17/838,686

(22) Filed: Jun. 13, 2022

(65) Prior Publication Data

US 2022/0398692 A1     Dec. 15, 2022

Related U.S. Application Data (60) Provisional application No. 63/210,452, filed on Jun. 14, 2021.

(51) Int. Cl.
    *G06T 3/40*        (2024.01)
    *G06T 9/00*        (2006.01)
    (Continued)

(52) U.S. Cl.
    CPC ............ *H04N 19/192* (2014.11); *G06T 3/40* (2013.01); *G06T 9/00* (2013.01); *H04N 19/20* (2014.11);
    (Continued)

(58) Field of Classification Search
None
See application file for complete search history.

(56) References Cited

U.S. PATENT DOCUMENTS

2019/0215482 A1    7/2019   Sathya et al.
2024/0281925 A1*   8/2024   Chida .................. G06V 40/172

FOREIGN PATENT DOCUMENTS

JP         2021-77376 A     5/2021

OTHER PUBLICATIONS

Xiaoming Li et al., "Blind Face Restoration via Deep Multi-scale Component Dictionaries", arXiv:2008.00418v1 [cs.CV], Aug. 2, 2020, pp. 1-16.

(Continued)

*Primary Examiner* — Tyler W. Sullivan
(74) *Attorney, Agent, or Firm* — Sughrue Mion, PLLC (57) ABSTRACT

A method and apparatus for adaptive decoding of compressed video for video conferencing may be provided. The method may include receiving compressed video data comprising a plurality of video frames, and determining, a selection signal indicating whether at least one of a face restoration technique and a face reenactment technique is to be used. The method may include adaptively selecting and transmitting a single reference frame or a plurality of low resolution (LR) frames comprising essential facial features, generating, one or more recovered facial features and one or more respective decompressed low resolution (LR) extended face areas based on the selection signal and the compressed video data, and decoding a video frame from the plurality of video frames based on the one or more recovered facial features and the one or more respective decompressed low resolution (LR) extended face areas.

18 Claims, 9 Drawing Sheets

(51) Int. Cl.
  *H04N 19/192* (2014.01)
  *H04N 19/20* (2014.01)
(52) U.S. Cl.
  CPC .............. *G06T 2207/10016* (2013.01); *G06T 2207/20016* (2013.01); *G06T 2207/30201* (2013.01)

(56) References Cited

OTHER PUBLICATIONS

Egor Zakharov et al., "Fast Bi-layer Neural Synthesis of One-Shot Realistic Head Avatars", arXiv:2008.10174v1 [cs.CV], Aug. 24, 2020, pp. 1-34.
International Search Report issued Sep. 6, 2022 in International Application No. PCT/US2022/033335.
Written Opinion of the International Searching Authority issued Sep. 6, 2022 in International Application No. PCT/US2022/033335.
Oquab et al., "Low Bandwidth Video-Chat Compression using Deep Generative Models", arXiv.org, Dec. 1, 2020, https://arxiv.org/pdf/2012.00328 (11 pages total).
Konuko et al., "Ultra-Low Bitrate Video Conferencing Using Deep Image Animation", arXiv.org, Dec. 1, 2020, https://arxiv.org/pdf/2012.00346 (5 pages total).
Justus Thies et al, "Face2Face: Real-time Face Capture and Reenactment of RGB Videos", arxiv.org, Cornell University Library, Jul. 29, 2020, XP081729031 (12 pages total).
Extended European Search Report issued Jun. 6, 2023 in European Application No. 22793622.6.
Japanese Office Action dated Mar. 26, 2023 in Application No. 2023-517833.
Nasrollahi et al., "Hallucination of Super-Resolved Face Images", ICSP2010 Proceedings, XP031817508, Oct. 24, 2010, pp. 641-644.
Communication issued Dec. 10, 2024 in European Application No. 22793622.6.

\* cited by examiner

VIDEO CONFERENCING BASED ON ADAPTIVE FACE RE-ENACTMENT AND FACE RESTORATION

CROSS REFERENCE TO RELATED APPLICATION(S)

This application is based on and claims priority to U.S. Provisional Patent Application No. 63/210,452, filed on Jun. 14, 2021, the disclosure of which is incorporated by reference herein in its entirety.

FIELD

Embodiments of the present disclosure relate to encoding and decoding video and image frames. More particularly, embodiments of the present disclosure relate to encoding and decoding video and image frames using machine learning.

BACKGROUND

The international standardization organizations ISO/IEC/IEEE are actively searching for AI-based video coding technologies, especially focusing on technologies based on deep Neural Networks (NNs). Various committees and agencies have been formed to investigate Neural Network Compression (NNR), Video Coding for Machine (VCM), Neural Network-based Video Coding (NNVC), etc. The Chinese AITISA and AVS also established corresponding expert groups to study standardization of similar technologies.

Video conferencing has become increasingly important recently, usually requiring low-bandwidth transmission to support joint conferencing of multiple end users. Compared to general video compression tasks, videos in a conferencing scenario mostly have similar content, i.e., one or a few talking person who are the main subjects of the video and take a major portion of the entire scene. While the unconstrained backgrounds can be arbitrarily complex, indoor, or outdoor, they are less important.

Recently, AI-based framework using face re-enactment has been proposed for use in video conferencing. Such exemplary frameworks may reduce the transmission bit consumption since for most frames, instead of transmitting the original pixels, only pose and expression related landmark features are transmitted. However, the re-enactment-based framework fails to guarantee any fidelity to the original face appearance and can result in dramatic artifacts in many cases. As an example, face re-enactment-based AI frameworks are generally very sensitive to occlusion, large motion, etc. and cannot be robustly used in practical video conferencing products.

Therefore, video conferencing frameworks that achieve a balance between transmission bit consumption and fidelity to facial features are needed.

SUMMARY

According to an aspect of the disclosure, a method for adaptive decoding of compressed video for video conferencing may be provided. The method may be executed by one or more processors, and the method include receiving compressed video data comprising a plurality of video frames; determining a selection signal indicating whether at least one of a face restoration technique and a face reenactment technique is to be used; in response to at least one of the face restoration technique and a face reenactment technique is to be used, adaptively selecting and transmitting a single reference frame or a plurality of low resolution (LR) frames comprising essential facial features; generating one or more recovered facial features and one or more respective decompressed low resolution (LR) extended face areas based on the selection signal and the compressed video data; and decoding a video frame from the plurality of video frames based on the one or more recovered facial features and the one or more respective decompressed low resolution (LR) extended face areas.

According to an aspect of the disclosure, an apparatus for adaptive decoding of compressed video for video conferencing may be provided. The apparatus may include at least one memory configured to store program code; and at least one processor configured to read the program code and operate as instructed by the program code. The program code may include receiving code configured to cause the at least one processor to receive compressed video data comprising a plurality of video frames; first determining code configured to cause the at least one processor to determine a selection signal indicating whether at least one of a face restoration technique and a face reenactment technique is to be used; adaptive selection code configured to cause the at least one processor to, in response to at least one of the face restoration technique and a face reenactment technique is to be used, adaptively select and transmit a single reference frame or a plurality of low resolution (LR) frames comprising essential facial features; first generating code configured to cause the at least one processor to generate one or more recovered facial features and one or more respective decompressed low resolution (LR) extended face areas based on the selection signal and the compressed video data; and decoding code configured to cause the at least one processor to decode a video frame from the plurality of video frames based on the one or more recovered facial features and the one or more respective decompressed low resolution (LR) extended face areas.

According to an aspect of the disclosure, a non-transitory computer readable medium storing instructions for adaptive decoding of compressed video for video conferencing for may be provided. The instructions, when executed by at least one processor, may cause the at least one processor to receive compressed video data comprising a plurality of video frames; determine a selection signal indicating whether at least one of a face restoration technique and a face reenactment technique is to be used; in response to at least one of the face restoration technique and a face reenactment technique is to be used, adaptively select and transmit a single reference frame or a plurality of low resolution (LR) frames comprising essential facial features; generate one or more recovered facial features and one or more respective decompressed low resolution (LR) extended face areas based on the selection signal and the compressed video data; and decode a video frame from the plurality of video frames based on the one or more recovered facial features and the one or more respective decompressed low resolution (LR) extended face areas.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

According to embodiments of the present disclosure a framework for video conferencing based on face restoration (or face hallucination) and face re-enactment (or face manipulation) may be provided. Face restoration may recover realistic details from a low-quality (LQ) face to a high-quality (HQ) face based on facial landmark features, maintaining high fidelity of the face appearance with moderate compression rate. Face re-enactment may generate a realistic target face based on a real source face and the facial landmark features of the target face, achieving a high compression rate with the risk of losing visual fidelity. In terms of compression rate, face re-enactment can achieve very high compression rate, where the system only transmits one source face image and facial landmark features to generate all target faces. In comparison, face restoration requires transmitting an LQ face image in addition to the facial landmark features for every target face.

Embodiments of the present disclosure are directed to combining the two techniques to adaptively select the most appropriate method to use in the video conferencing system, where only facial features as well as a small amount of down-sampled frames are transmitted. Embodiments of the present disclosure enable a reduction in the transmission cost along with high fidelity faces recovered on the decoder side based on the down-sampled frames and facial features. By adaptively combining these two techniques, the proposed method can automatically balance the visual fidelity and the compression rate to achieve effective video conferencing and avoid unpleasant artifacts.

Figure 1:
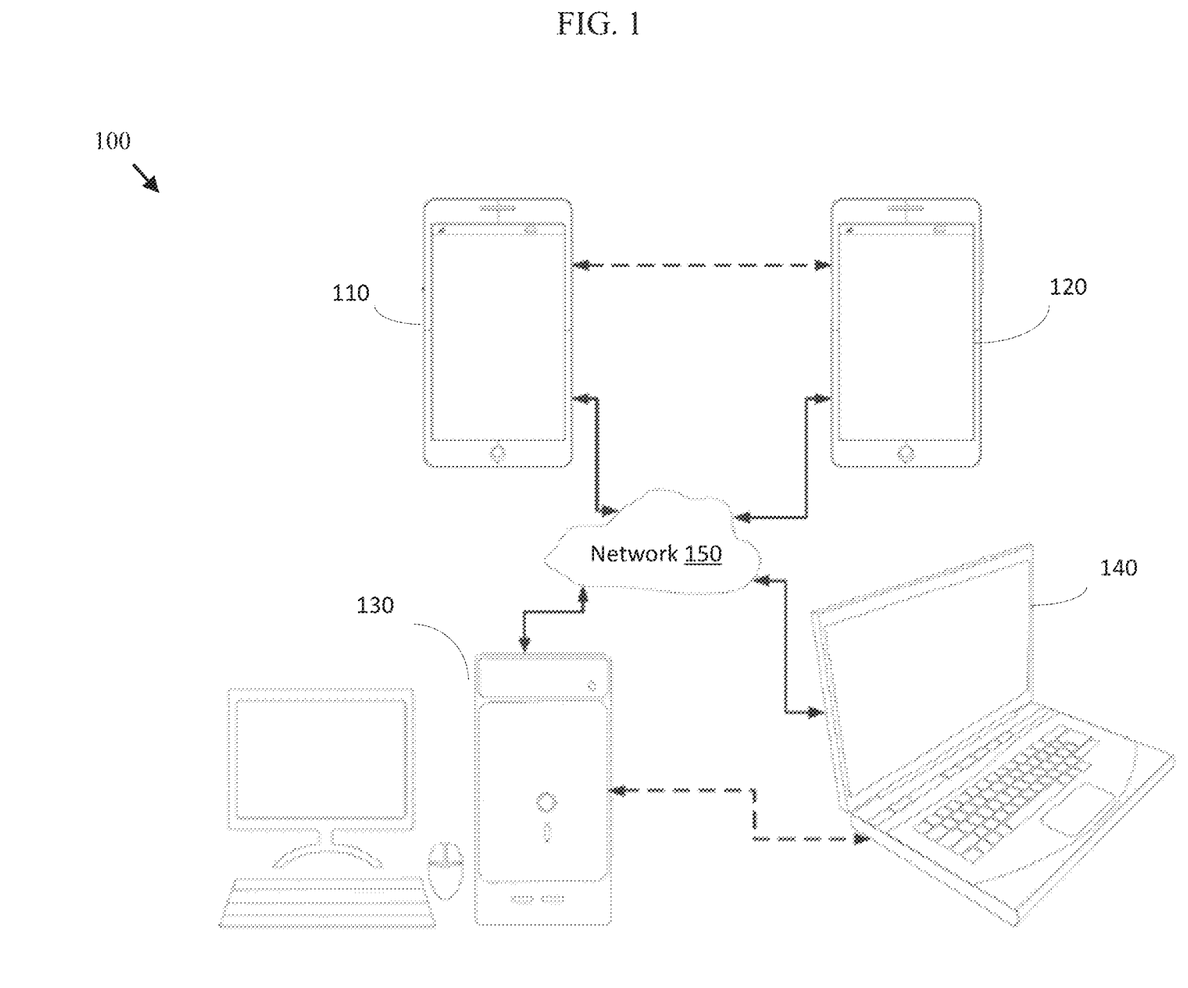
FIG. 1 is a simplified block diagram of a communication system, according to an embodiment.

FIG. 1 illustrates a simplified block diagram of a communication system (100) according to an embodiment of the present disclosure. The communication system (100) may include at least two terminals (140-130) interconnected via a network (150). For unidirectional transmission of data, a first terminal (140) may code video data at a local location for transmission to the other terminal (130) via the network (150). The second terminal (130) may receive the coded video data of the other terminal from the network (150), decode the coded data and display the recovered video data. Unidirectional data transmission may be common in media serving applications and the like.

FIG. 1 illustrates a second pair of terminals (110, 120) provided to support bidirectional transmission of coded video that may occur, for example, during videoconferencing. For bidirectional transmission of data, each terminal (110, 120) may code video data captured at a local location for transmission to the other terminal via the network (150). Each terminal (110, 120) also may receive the coded video data transmitted by the other terminal, may decode the coded data and may display the recovered video data at a local display device.

In FIG. 1, the terminals (140-120) may be illustrated as servers, personal computers and smart phones but the principles of the present disclosure are not so limited. Embodiments of the present disclosure find application with laptop computers, tablet computers, media players and/or dedicated video conferencing equipment. The network (150) represents any number of networks that convey coded video data among the terminals (140-120), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
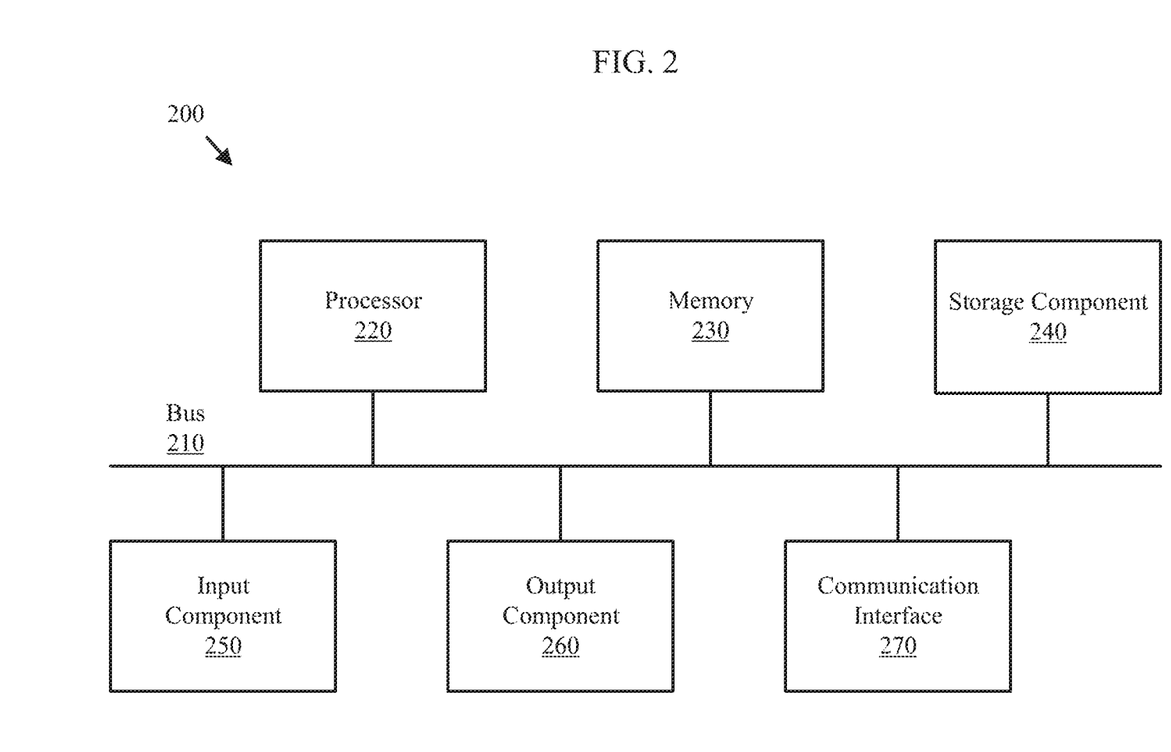
FIG. 2 is a block diagram of example components of one or more devices of FIG. 1.

FIG. 2 is a block diagram of example components of one or more devices of FIG. 1.

A device 200 may correspond to the any one of the terminals (110-140). As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3A:
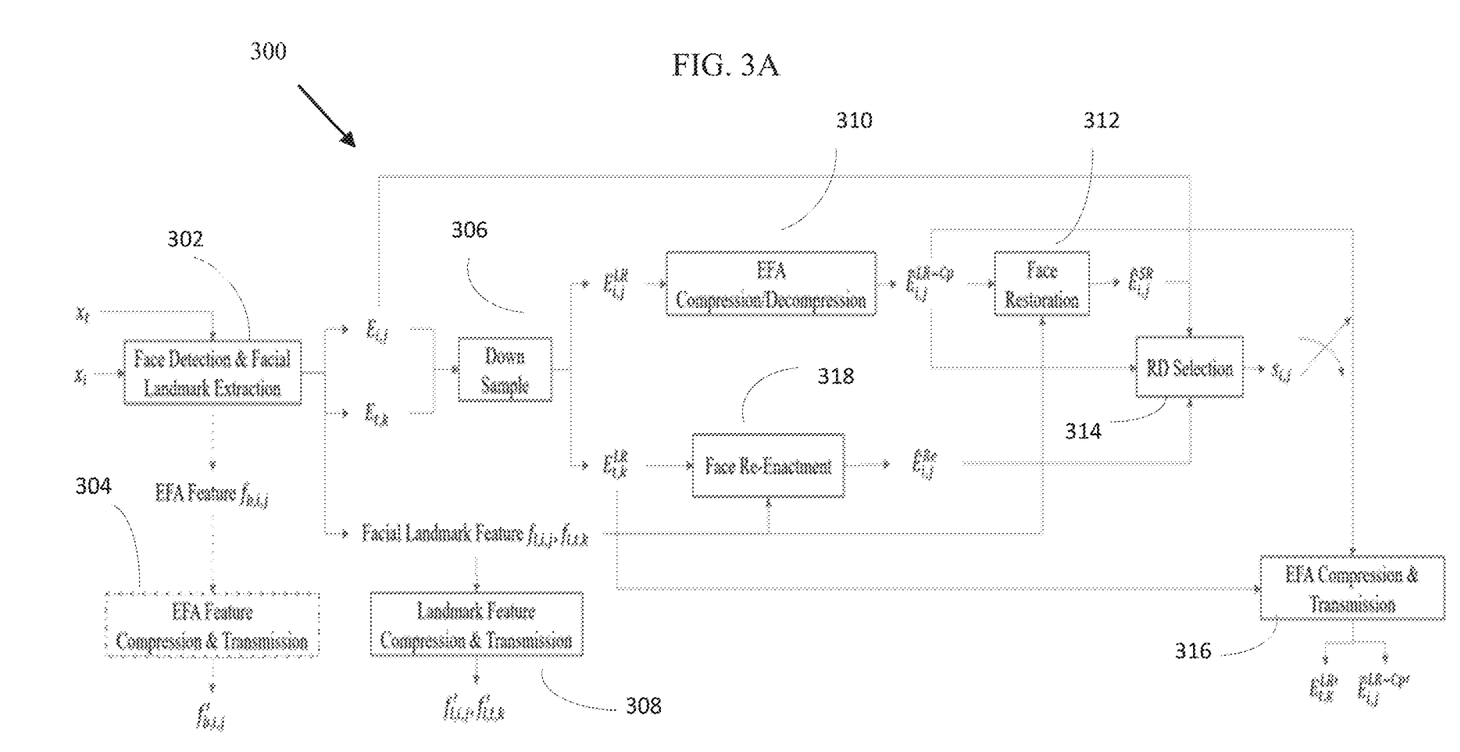
FIGS. 3A-3B are diagrams of exemplary encoders in a video conferencing framework, according to an embodiment.

FIG. 3A is an exemplary diagram illustrating an encoder 300 according to an embodiment of the present disclosure.

The encoder 300 may correspond to a component in any one of the terminals (110-140). As shown in FIG. 3A, the encoder 300 may include face detection and facial landmark extraction 302, extended face area (EFA) feature compression and transmission 304, down sampler 306, landmark feature compression and transmission 308, EFA compression/decompression 310, face restoration 312, face reenactment 318, RD selection 314, and EFA compression and transmission 316.

Given an input sequence of image or video frames $x_1$, $x_2$, . . . , a reference frame $x_t$ may be determined. In an embodiment, the input sequence may be a group of pictures (GoP), and the reference frame $x_t$ may be the I frame of the GoP. For all the frames (both the reference frame and non-reference frame), Face Detection & Facial Landmark Extraction 302 may determine one or a plurality of valid faces from each video frame $x_i$. In an embodiment, only the most prominent (e.g., largest) face may detected, and in another embodiment, all faces in the frame satisfying a condition (e.g., with a large enough size exceeding a threshold) may be detected. For the j-th face in $x_i$, a set of facial landmarks may be determined and a set of facial landmark features $f_{l,i,j}$ may be computed correspondingly, which may be used by a decoder for restoring the j-th face in $x_i$. Face Detection & Facial Landmark Extraction 302 may also compute an Extended Face Area (EFA) $E_{i,j}$, for the j-th face in $x_i$, e.g., by extending the bounding area (boundary as a rectangle, eclipse, or fine-grained segmentation boundary) of the original detected face to include additional hair, body parts, or even backgrounds. As an example, in the case where there is one prominent face, the EFA may be the entire frame, or the main portion of the frame by removing the unimportant background regions. Face Detection & Facial Landmark Extraction 302 may use any face detector to locate face areas in each video frame $x_1$, such as any object detection neural network (NN) by treating human faces as a special object category or other NN architectures specially designed for locating human faces. Face Detection & Facial Landmark Extraction 302 may also use any facial landmark detector to locate pre-determined facial landmarks for each detected face (e.g., landmarks around left/right eyes, nose, mouse, etc.). In some embodiment, one or more multi-task NN may be used to locate faces and the associated landmarks at the same time. The facial landmark feature $f_{l,i,j}$ may be the intermediate latent representation computed by the facial landmark detector, which may be directly used to locate the landmarks of the j-th face. Additional NNs may also be applied to further process the intermediate latent representation and compute the facial landmark feature $f_{l,i,j}$. For example, information may be aggregated from feature maps corresponding to individual landmarks around a facial part, e.g., right eye, into a joint feature about that facial part.

In some embodiments, the k-th face in the reference frame $x_t$ and the j-th face in the non-reference frame may have one-to-one correspondence. As an example, when there is one prominent face in the video, the correspondence of the only face in the reference frame and non-reference frame may be automatically established. In some embodiments, where there are multiple prominent faces in the video stream, the correspondence may be established between the j-th face in the non-reference frame and the k-th reference face in the reference frame, e.g., the same person using any techniques, including but not limited to face tracking, face recognition, re-identification, etc.

In some embodiments, for the j-th face in the non-reference frame $x_i$ with a corresponding k-th face in the reference frame $x_t$, the corresponding EFA $E_{i,j}$ and $E_{t,k}$ may both be down-sampled in the Down Sample 306 into a Low-Resolution (LR) EFA $E_{i,j}^{LR}$ and an LR reference EFA $E_{t,k}^{LR}$, with a lower resolution. Based on the facial landmark feature $f_{l,i,j}$ of $E_{i,j}$, the facial landmark feature $f_{l,t,k}$ of $E_{t,k}$, and the LR reference EFA $E_{t,k}^{LR}$, Face Re-enactment 318 may compute a re-enacted EFA $\hat{E}_{i,j}^{Re}$. In another embodiment, the LR EFA $E_{i,j}^{LR}$ may be compressed and decompressed the LR EFA $E_{i,j}^{LR}$ into a compressed $\overline{E}_{i,j}^{LR-Cp'}$ and decompressed EFA $\overline{E}_{i,j}^{LR-Cp}$ in EFA Compression/Decompression 310. In some embodiments, subsequently, Face Restoration 312 may compute a reconstructed EFA $\hat{E}_{i,j}^{SR}$ from $\overline{E}_{i,j}^{LR-Cp}$ by using the facial landmark features $f_{l,i,j}$. Based on the original $E_{i,j}$, in RD Selection 314, a Rate-Distortion (RD) loss may be computed for the reconstructed $\hat{E}_{i,j}^{SR}$ as $Rd(\hat{E}_{i,j}^{SR})$ and an RD loss may be computed for the re-enacted $\hat{E}_{i,j}^{Re}$ as $Rd(\hat{E}_{i,j}^{Re})$ In an embodiment, the RD loss $Rd(\hat{E}_{i,j}^{SR})$ may be given by $Rd(\hat{E}_{i,j}^{SR})=D(E_{i,j},\hat{E}_{i,j}^{SR})+\lambda R(\hat{E}_{i,j}^{LR-Cp'})$, where $D(E_{i,j},\hat{E}_{i,j}^{SR})$ may be the distortion (e.g., the MSR, SSIM, etc.) measuring the difference between the reconstructed $\hat{E}_{i,j}^{SR}$ and the original $E_{i,j}$; $R(\overline{E}_{i,j}^{LR-Cp'})$ may be the rate loss which measures the bit consumption of transmitting $\overline{E}_{i,j}^{LR-Cp'}$; and $\lambda$ may be a hyperparameter to balance these two trade-off terms. The RD loss $Rd(\hat{E}_{i,j}^{Re})$ may contain the distortion loss $D(E_{i,j},\hat{E}_{i,j}^{Re})$ (e.g., MSE, SSIM, etc.) since no additional EFA needs to be transmitted. $D(E_{i,j},\hat{E}_{i,j}^{Re})$ and $D(E_{i,j},\hat{E}_{i,j}^{SR})$ may use different distortion metrics. Other loss or regularization terms may also be added into consideration, such as the complexity loss of taking different choices. Based on $Rd(\hat{E}_{i,j}^{Re})$ and $Rd(\hat{E}_{i,j}^{SR})$, the RD Selection 314 may obtain a selection signal $s_{i,j}$, which may take binary values indicating which method may be used for generating the current EFA $E_{i,j}$. When the selection signal indicates that the face restoration method may be used, the compressed EFA $\overline{E}_{i,j}^{LR-Cp\prime}$ may be passed into EFA Compression & Transmission 316 (e.g., further compressed by quantization and entropy coding) to be transmitted to the decoder. The LR reference EFA En may also further compressed by the EFA Compression & Transmission 312 into a compressed LR reference EFA $E_{t,k}^{LR\prime}$, which may transmitted to the decoder. The facial landmark features $f_{l,i,j}$, $f_{l,t,k}$ may also compressed by Landmark Feature Compression & Transmission 308 into compressed facial landmark features $f'_{l,i,j}, f'_{l,t,k}$, which may be transmitted to the decoder. The selection signal $s_{i,j}$ is also transmitted to the decoder.

In some embodiments, a set of or a plurality of EFA features $f_{b,i,j}$ may be computed, which may be used by the decoder for helping restoring the EFA of the j-th face in $x_i$. These features may also be encoded and transmitted by EFA Compression & Transmission 316 into compressed EFA features $f'_{b,i,j}$. The EFA feature $f_{b,i,j}$ may be the intermediate latent representation computed by the face detector corresponding to the j-th face. Additional NNs can also be used to compute $f_{b,i,j}$ based on the intermediate latent representation, e.g., by emphasizing the background region other than the actual facial area. The present disclosure is not limited to any methods or NN architectures of the face detector, facial landmark detector, facial landmark feature extractor, or the EFA feature extractor.

EFA Compression/Decompression 310 may use any video coding frameworks, such as HEVC, VVC, NNVC, or end-to-end image/video coding. Similarly, EFA Compression & Transmission 316 may use any video coding frameworks, such as HEVC, VVC, NNVC, or end-to-end image/video coding.

Landmark Feature Compression & Transmission 308 may use various methods to compress the facial landmark features efficiently. In an embodiment, a codebook-based mechanism may be used where for each facial part (e.g., the right eye) a codebook can be generated. For a specific facial part of a specific face (e.g., right eye of the current face in the current frame), its facial landmark feature may be represented by a weighted combination of codewords in this codebook. The codebook may be stored at the decoder side, and only the weight coefficients for the codewords need to be transfer to the decoder side to recover the facial landmark feature. EFA Feature Compression & Transmission 304 may also use various methods to compress the EFA features. In an embodiment, an EFA codebook may be used where a specific EFA feature may be represented by weighted combination of the EFA codewords, and only weight coefficients for the codewords need to be transfer to recover the EFA feature.

Face Re-enactment 318 may use any face re-enactment methods. In an embodiment, a face re-enactment method known in the art may be applied to obtain an LR re-enacted EFA $\hat{E}_{i,j}^{LR-Re}$, which may be further up-sampled by an up-sampling method (e.g., a general super-resolution method or a face super-resolution method) to compute the re-enacted EFA $\hat{E}_{i,j}^{Re}$. Face Restoration 312 may use any general super-resolution method or a face super-resolution method.

Figure 3B:
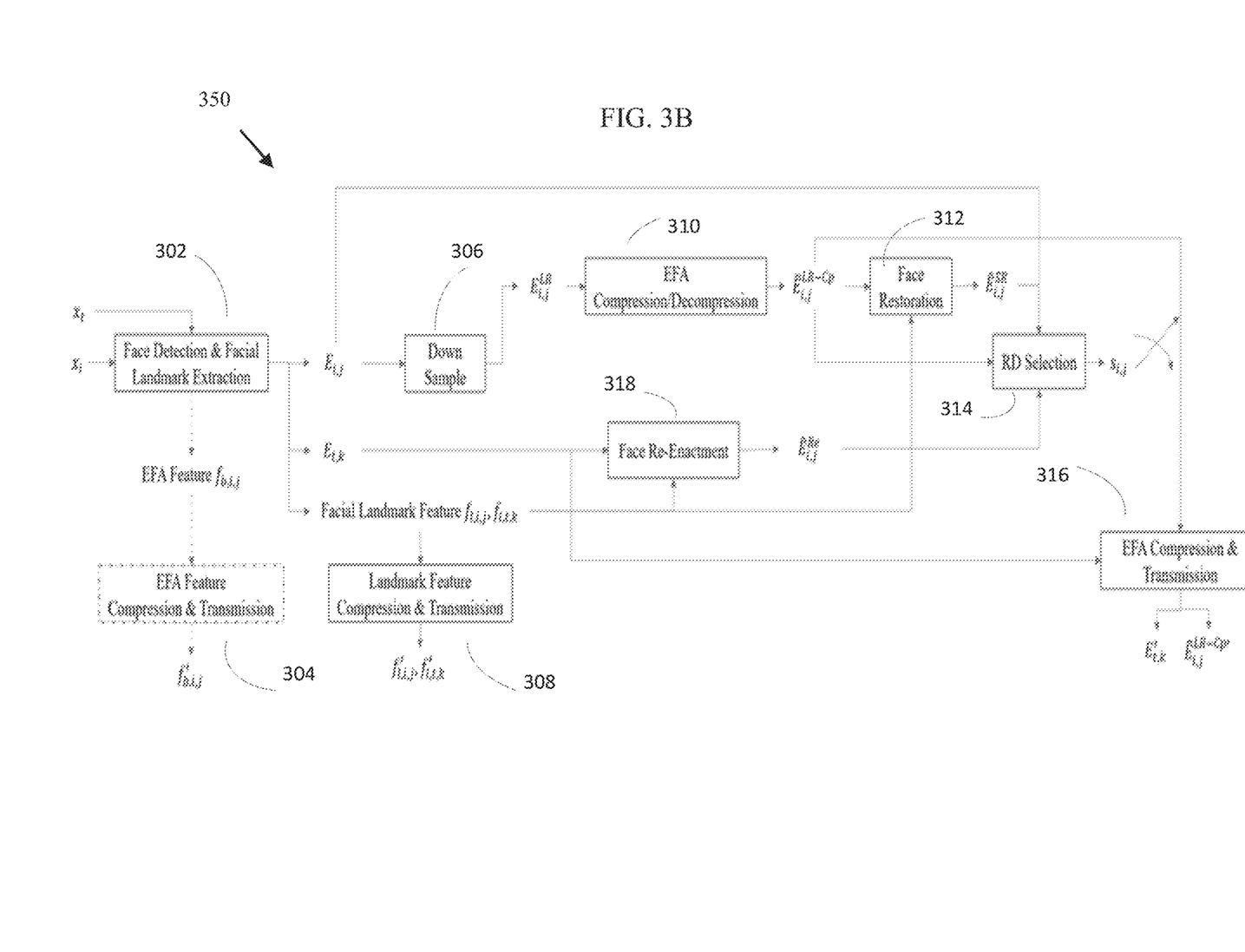

FIG. 3B is an exemplary diagram illustrating an encoder 350 according to an embodiment of the present disclosure.

The encoder 350 may be similar to encoder 300 in FIG. 3A, with a difference being that the reference EFA $E_{t,k}$ may not be down-sampled and Face Re-enactment 318 may use the original reference EFA $E_{t,k}$ and the facial landmark features $f_{l,i,j}$, $f_{l,t,k}$ to compute the re-enacted EFA $\hat{E}_{i,j}^{Re}$, based on a face re-enactment method known in the art. The original reference EFA $E_{t,k}$ at the original resolution may be further compressed by EFA Compression & Transmission 316 into a compressed reference EFA $E'_{t,k}$, which may be transmitted to the decoder.

Figure 4A:
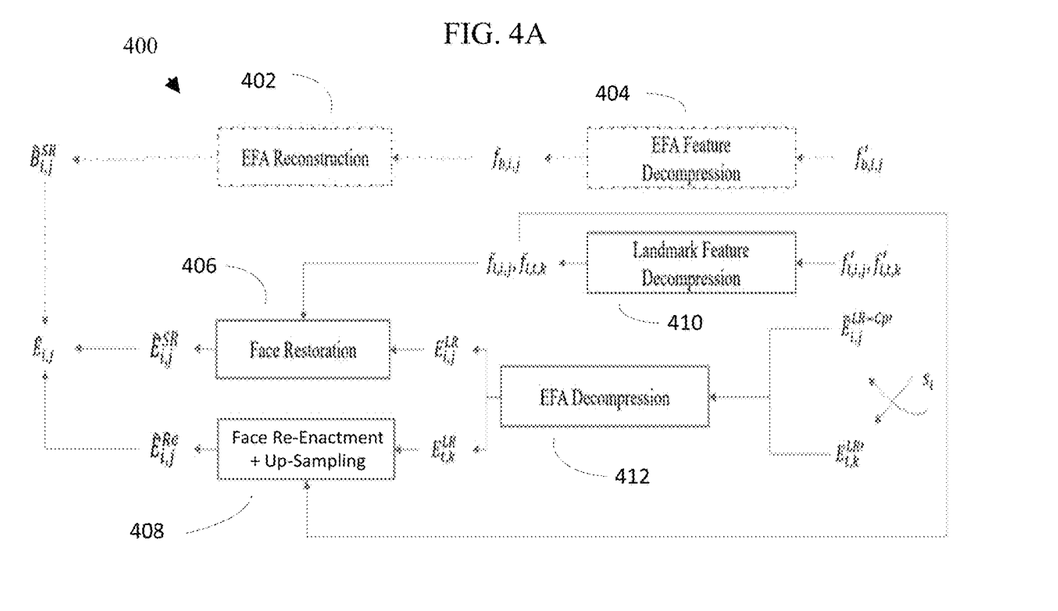
FIGS. 4A-4B are diagrams of exemplary decoders in a video conferencing framework, according to an embodiment.

FIG. 4A is an exemplary diagram illustrating a decoder 400 according to an embodiment of the present disclosure.

The decoder 400 may correspond to a component in any one of the terminals (110-140). As shown in FIG. 4A, the decoder 400 may include EFA reconstruction 402, EFA feature decompression 404, face restoration 406, face reenactment 408, landmark feature decompression 410, and EFA decompression 412.

A set of compressed facial landmark features $f'_{l,i,j}, f'_{l,t,k}$ may be received by the decoder 400 which may be passed through Landmark Feature Decompression 410 to recover the facial landmark features $f_{l,i,j}$, $f_{l,t,k}$. As disclosed on the encoder side, Landmark Feature Decompression 410 may use any decompression methods to match the encoder 300 or encoder 350. Decoder 400 may also receive the compressed LR reference EFA $E_{t,k}^{LR\prime}$, which may be used to recover the LR reference EFA $E_{t,k}^{LR}$ in EFA Decompression 412. Any decompression methods, such as any video decoding methods, hybrid video decoding methods, or end-to-end image/video decoding methods that matches the encoder side may be used here.

The selection signal $s_{i,j}$ may be received by decoder 400. In some embodiments, when the selection signal indicates that the face restoration technique will be used, decoder 400 may receive the compressed LR EFA $\overline{E}_{i,j}^{LR-Cp\prime}$, may be decompressed to recover $E_{i,j}^{LR}$ in EFA Decompression 412. The recovered landmark features $f_{l,i,j}$ and the recovered LR EFA $E_{i,j}^{LR}$ may be passed through Face Restoration 406 to compute a reconstructed High Resolution (HR) EFA $\hat{E}_{i,j}^{SR}$. In an embodiment, Face Restoration 406 may include a conditional Generative Adversarial Network (GAN), conditioned on the landmark features corresponding to different facial parts, to generate facial details $L_{i,j}$, which may include a set of facial detail representations of the j-th face in frame $x_i$. Simultaneously, the recovered LR EFA $E_{i,j}^{LR}$ may be up-sampled (either by traditional interpolation or an up-sampling NN) to $E_{i,j}^{SR\prime}$, which may be combined with the facial details $L_{i,j}$ through a fusion NN to generate the final $\hat{E}_{i,j}^{SR}$.

In some embodiments, when the selection signal indicates that the face re-enactment technique will be used, the recovered landmark features $f_{l,i,j}$ and $f_{l,t,k}$, as well as the LR reference EFA $E_{t,k}^{LR}$ may be passed to Face Re-enactment 408 to compute a re-enacted EFA $\hat{E}_{i,j}^{Re}$. In an embodiment, a same Face Re-enactment method as on the encoder may be used to generate a re-enacted LR EFA $E_{i,j}^{LR-Re}$ based on $f_{l,i,j}$, $f_{l,t,k}$, and $E_{t,k}^{LR}$. Then $E_{i,j}^{LR-Re}$ may be up-sampled (either by traditional interpolation or an up-sampling NN) to the final re-enacted EFA $E_{i,j}^{HR-Re}$. This disclosure does not limit the NN architectures of Face Restoration 406 or Face Re-enactment 408.

Depending on the selection signal, either the re-enacted EFA $\hat{E}_{i,j}^{Re}$ or the reconstructed EFA $\hat{E}_{i,j}^{SR}$ may be the final decoded EFA $\hat{E}_{i,j}$ for the j-th face in frame $x_i$. It may be combined with other decoded parts of the frame $x_i$ to generate the final decoded frame $\hat{x}_i$, e.g., by blending or matting.

In some embodiments, received EFA feature $f'_{b,i,j}$ may be passed through EFA Feature Decompression 404 to generate decompressed EFA feature $f_{b,i,j}$. Then EFA Reconstruction 402 may be used to compute a reconstructed HR EFA background $\hat{B}_{i,j}^{SR}$, focusing on restoring the non-facial background region around the j-th face in frame $x_i$. $\hat{B}_{i,j}^{SR}$ may be combined with either $\hat{E}_{i,j}^{Re}$ or $\hat{E}_{i,j}^{SR}$ (depending on the selection signal) to obtain the final decoded EFA $\hat{E}_{i,j}$, e.g., by blending or matting.

Figure 4B:
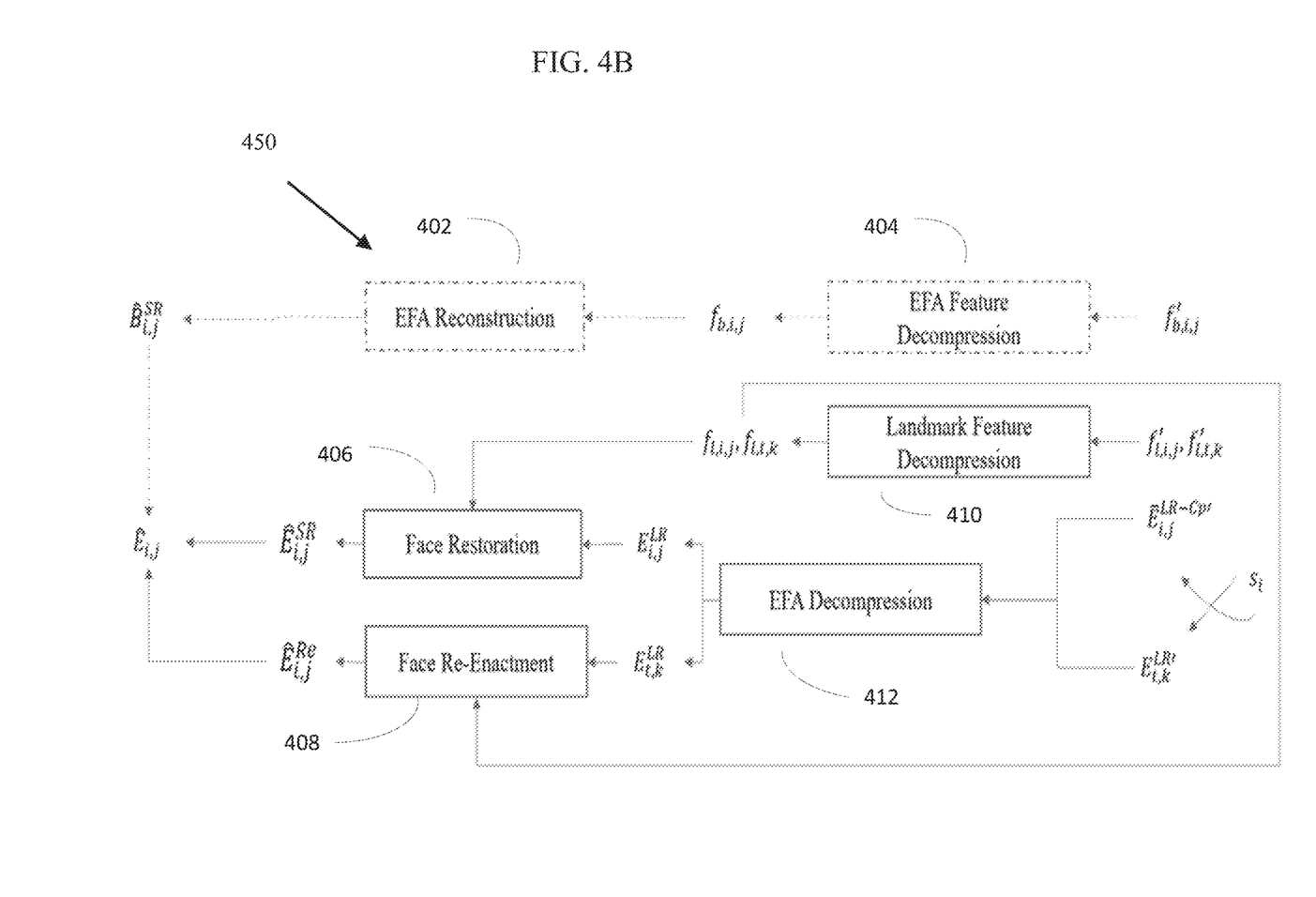

FIG. 4B is an exemplary diagram illustrating an decoder 450 according to an embodiment of the present disclosure.

The decoder 450 may be similar to decoder 400 in FIG. 4A, with a difference being that the compressed reference EFA $E'_{t,k}$ of the original resolution may be received, which may be passed through EFA Decompression 412 to directly compute the decompressed reference EFA $E_{t,k}$ with the original resolution. Face Re-enactment 408 may directly generate the re-enacted EFA $\hat{E}_{i,j}^{Re}$ without additional up-sampling.

Several neural network based models may be trained before deployment, including the models in components of encoder 300, encoder 350, decoder 400, and decoder 450. Training may also be required if learning-based down-sampling methods or learning-based compression/decompression methods are used. In an embodiment, all these components may use Deep Neural Network (DNN) based methods, and the weight parameters of these DNNs may be trained. In other embodiments, some of these components may use traditional learning-based methods, such as the traditional facial landmark detector, and the corresponding model parameters also need to be trained. Exemplary and non-limiting training process may be disclosed herein.

Figure 5:
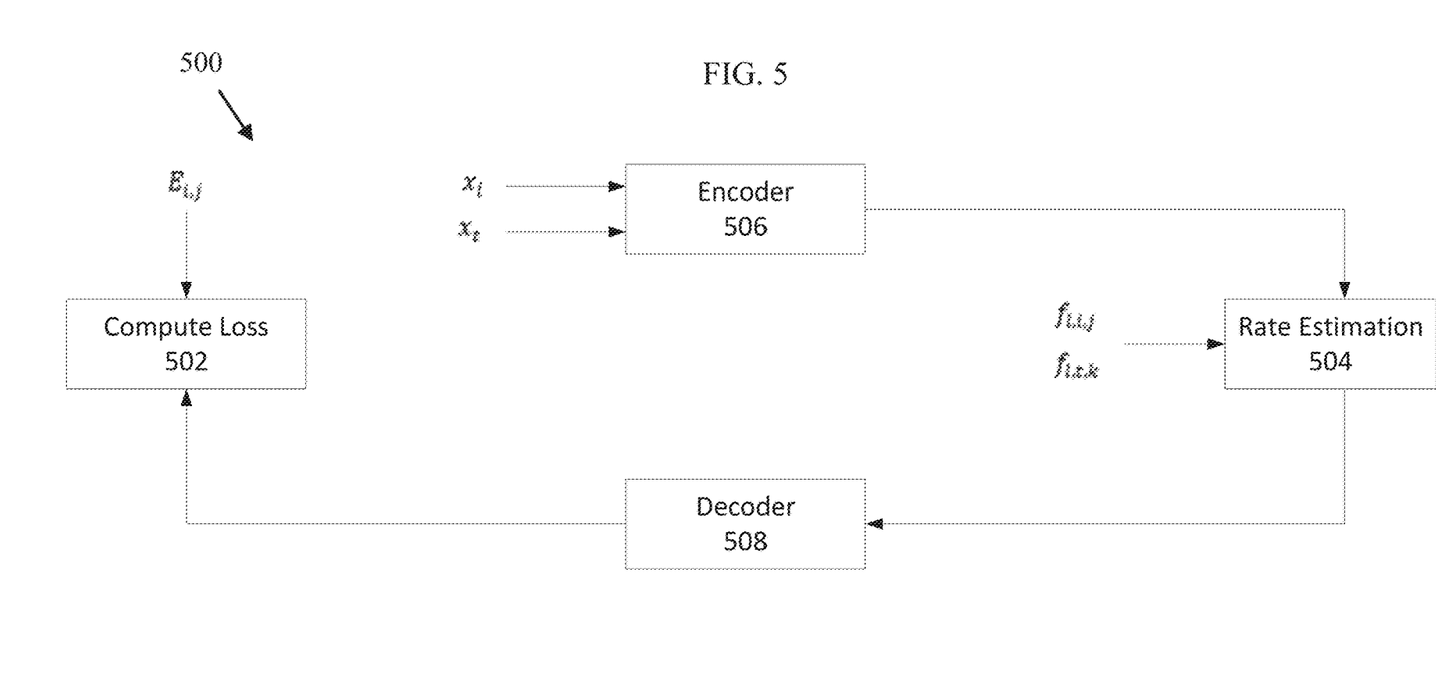
FIG. 5 is an exemplary diagram for training one or more neural networks in a video conferencing framework, according to an embodiment.

FIG. 5 is an exemplary diagram of training process 500 for training one or more neural networks in a video conferencing framework, according to an embodiment.

As shown in FIG. 5, training process 500 may include an encoder 506, rate estimation 504, compute loss 502, and decoder 508. According to embodiments, encoder 506 in training process 500 may be implemented using encoder 300 or encoder 350. According to embodiments, decoder 506 in training process 500 may be implemented using decoder 400 or decoder 450.

For training, in some embodiments, compression/decompression methods may replace the non-differential process in the actual compression/decompression process with a noise modeling method. As an example, the actual quantization/dequantization process may be replaced with an entropy estimation method to estimate the actual bit rate after quantization. These noise modeling methods may add random noises to the signal that may need to be compressed and transmitted, mimicking the true data distribution of the compressed signal in the final test stage. Therefore, the noise model used may depend on the actual compression/decompression method used in practice.

Several types of losses may be computed in the training process to learn the learnable components, in Compute Loss 502. A distortion $D(E_{i,j}, \hat{E}_{i,j})$ may be computed between the original EFA $E_{i,j}$ and the decoded EFA $\hat{E}_{i,j}$ (e.g., MSR, SSIM, etc.). In addition, all the transmitted signals may be sent to Rate Estimation 504 to compute an estimated rate loss by any noise modeling method described herein or known in the art. The overall distortion $D(x_i, \hat{x}_i)$ may be computed between the original $x_i$ and decoded $\hat{x}_i$ (e.g., MSE, SSIM, etc.). An importance weight map may also be used to emphasize the distortion of the reconstructed facial area or different parts of the facial area. Other losses, such as a perceptual loss $P(x_i, \hat{x}_i)$ or $P(E_{i,j}, \hat{E}_{i,j})$ may also be computed, where a feature extraction DNN (e.g., the Visual Geometry Group (VGG) backbone network) may compute a feature representation based on $x_i$ and $\hat{x}_i$, or $E_{i,j}$ and $\hat{E}_{i,j}$, respectively. The difference (e.g., MSE) of feature representation computed based on $x_i$ and $\hat{x}_i$, or $E_{i,j}$ and $\hat{E}_{i,j}$, may be used as the perceptual loss. An adversarial loss $A(x_i, \hat{x}_i)$ or $A(E_{i,j}, \hat{E}_{i,j})$ may also be computed to measure how natural the computed $\hat{x}_i$ or $\hat{E}_{i,j}$ looks. For example, the true $x_1$ or the reconstructed $\hat{x}_i$ may be fed into a discriminator (which is usually a classification DNN like ResNet) to classify whether it is natural or reconstructed, and a classification error (e.g., cross-entropy loss) may be used as $A(x_i, \hat{x}_i)$. $A(E_{i,j}, \hat{E}_{i,j})$ $A(E_{i,j}, \hat{E}_{i,j}^{Re})$ may be computed in according to any techniques disclosed herein.

In Compute Loss 502, all different types of distortion losses, perceptual losses, and adversarial losses may be weighted combined as a joint loss, whose gradient may be computed to update the model parameters through back-propagation. The combining weights may balance the importance of different losses, which may be given as hyperparameters.

According to embodiments of the present disclosure, different components may be updated at different times with different updating frequencies, based on different types of losses. In some embodiments, only some components may be updated after deployment periodically or frequently when new training data is available. In some embodiments, only part of the model parameters may be updated after deployment. The present disclosure does not limit the optimization methods and/or techniques that may be used, the frequency of model updates, or the percentage of model parameters or model layers to be updated.

Figure 6:
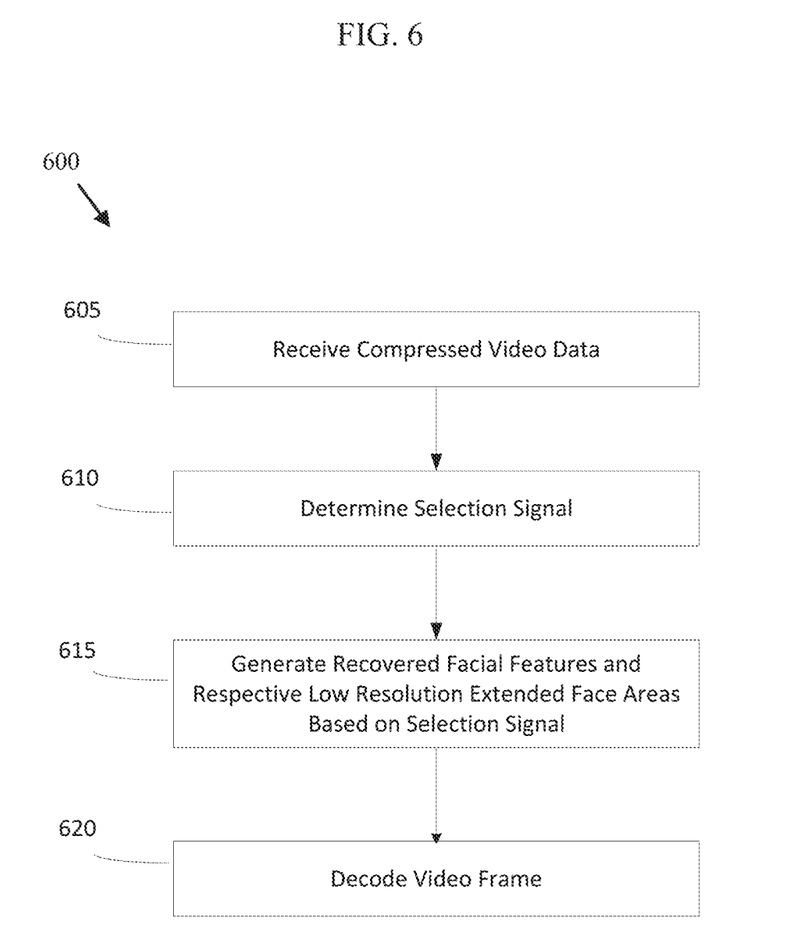
FIG. 6 is an exemplary flowchart for decoding video or image frames in a video conferencing framework, according to embodiments.

FIG. 6 is a flowchart illustrating exemplary decoding process 600 for decoding video or image frames in a video conferencing framework, according to embodiments.

At operation 605, video data may be received. In some embodiments, compressed video data comprising a plurality of video frames may be received. The compressed video data may include one or more compressed facial landmark features, compressed respective low resolution (LR) extended face areas, and the selection signal.

At operation 610, a selection signal indicating whether a face restoration technique or a face reenactment technique is to be used may be determined. The selection signal may be any appropriate value or may be a binary number. The selection signal may be based on a comparison of a face restoration loss and a face reenactment loss. In some embodiments, in response to the selection signal being determined and determining that at least one of the face restoration technique and a face reenactment technique is to be used, operation 610 may include adaptively selecting and transmitting a single reference frame or a plurality of low resolution (LR) frames comprising essential facial features.

At operation 615, one or more recovered facial features and one or more respective decompressed low resolution (LR) extended face areas may be generated based on the selection signal and the compressed video data. In some embodiments, the one or more recovered facial features and one or more respective decompressed low resolution (LR) extended face areas may be generated based on the selection signal, the single reference frame or the plurality of low resolution (LR) frames, and the compressed video data.

In some embodiments, the generating the one or more recovered facial features and the one or more respective decompressed low resolution (LR) extended face areas may include generating the one or more recovered facial features based on decompression of compressed facial landmark features. It may further include generating the one or more respective decompressed low resolution (LR) extended face areas based on decompression of compressed respective low resolution (LR) extended face areas.

According to some embodiments, based on the selection signal indicating using the face restoration technique, one or more respective high resolution (HR) extended face areas may be generated using the face restoration technique and the one or more respective decompressed low resolution (LR) extended face areas. The face restoration technique may include generating respective facial details corresponding to facial parts based on the one or more recovered facial features using a trained neural network and/or generating the one or more respective high resolution (HR) extended face areas based on a fusion of the respective facial details and one or more up-sampled respective decompressed low resolution (LR) extended face areas.

According to some embodiments, based on the selection signal indicating using the face reenactment technique, one or more respective high resolution (HR) extended face areas may be generated using the face reenactment technique and the one or more respective decompressed low resolution (LR) extended face areas, wherein the one or more respective decompressed low resolution (LR) extended face areas may include at least one respective decompressed reference low resolution (LR) extended face area. The face reenactment technique may include generating one or more respective intermediate representations based on the at least one respective decompressed reference low resolution (LR) extended face area and the one or more recovered facial features using a trained neural network and/or generating the one or more respective high resolution (HR) extended face areas based on up-sampling the one or more respective intermediate representations.

At operation 620, a video frame from the plurality of video frames may be decoded based on the one or more recovered facial features and the one or more respective decompressed low resolution (LR) extended face areas. Decoding the video frame may include generating a final decoded frame based on a combination of one or more respective high resolution (HR) extended face areas and other decoded parts of the video frame.

Figure 7:
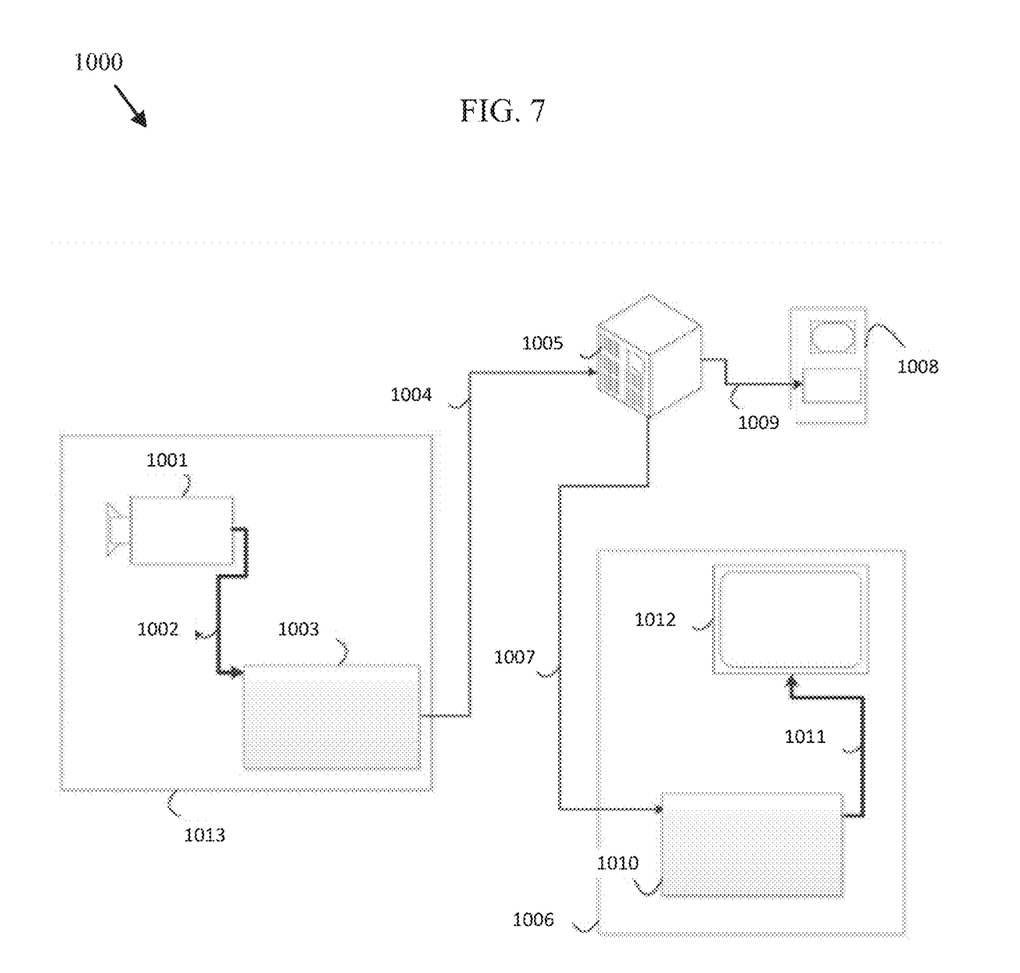
FIG. 7 is a diagram of a streaming environment, according to an embodiment.

FIG. 7 illustrates, as an example for an application for the disclosed subject matter, the placement of a video encoder and decoder in a video conferencing and/or streaming environment 1000. The disclosed subject matter may be equally applicable to other video enabled applications, including, for example, video conferencing, digital TV, storing of compressed video on digital media including CD, DVD, memory stick and the like, and so on.

A streaming system may include a capture subsystem 1013 that may include a video source 1001, for example a digital camera, creating, for example, an uncompressed video sample stream 1002. That sample stream 1002, depicted as a bold line to emphasize a high data volume when compared to encoded video bitstreams, may be processed by an encoder 1003 coupled to the camera 1001. The encoder 1003 may include hardware, software, or a combination thereof to enable or implement aspects of the disclosed subject matter as described in more detail below. The encoded video bitstream 1004, depicted as a thin line to emphasize the lower data volume when compared to the sample stream, may be stored on a streaming server 1005 for future use. One or more streaming clients 1006, 1008 may access the streaming server 1005 to retrieve copies 1007, 1009 of the encoded video bitstream 1004. A client 1006 may include a video decoder 1010 which decodes the incoming copy of the encoded video bitstream 1007 and creates an outgoing video sample stream 1011 that may be rendered on a display 1012 or other rendering device. In some streaming systems, the video bitstreams 1004, 1007, 1009, may be encoded according to certain video coding/compression standards. Examples of those standards include H.265 HEVC. Under development is a video coding standard informally known as Versatile Video Coding (VVC). The disclosed subject matter may be used in the context of VVC.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of adaptive decoding of compressed video for video conferencing, the method executed by one or more processors, the method comprising:
 receiving compressed video data comprising a plurality of video frames;
 determining a selection signal indicating whether at least one of a face restoration technique and a face reenactment technique is to be used, wherein the selection signal is based on a comparison of a first rate-distortion loss associated with a reconstructed extended face area reconstructed through face restoration and a second rate-distortion loss associated with the reconstructed extended face area reconstructed through face reenactment;
 in response to determining that at least one of the face restoration technique and the face reenactment technique is to be used, selecting and transmitting a single reference frame or a plurality of low resolution (LR) frames, the plurality of LR frames comprising only essential facial features;
 generating one or more recovered facial features and one or more respective decompressed low resolution (LR) extended face areas based on the selection signal, the single reference frame or the plurality of low resolution (LR) frames, and the compressed video data; and
 decoding a video frame from the plurality of video frames based on the one or more recovered facial features and the one or more respective decompressed low resolution (LR) extended face areas.

2. The method of claim 1, wherein the compressed video data comprises one or more compressed facial landmark features, compressed respective low resolution (LR) extended face areas, and the selection signal.

3. The method of claim 1, wherein the generating the one or more recovered facial features and the one or more respective decompressed low resolution (LR) extended face areas comprises:
 generating the one or more recovered facial features based on decompression of compressed facial landmark features; and
 generating the one or more respective decompressed low resolution (LR) extended face areas based on decompression of compressed respective low resolution (LR) extended face areas.

4. The method of claim 3, further comprising:
based on the selection signal indicating using the face restoration technique, generating one or more respective high resolution (HR) extended face areas using the face restoration technique and the one or more respective decompressed low resolution (LR) extended face areas; and
based on the selection signal indicating using the face reenactment technique, generating one or more respective high resolution (HR) extended face areas using the face reenactment technique and the one or more respective decompressed low resolution (LR) extended face areas, wherein the one or more respective decompressed low resolution (LR) extended face areas includes at least one respective decompressed reference low resolution (LR) extended face area.

5. The method of claim 4, wherein the face restoration technique comprises:
generating respective facial details corresponding to facial parts based on the one or more recovered facial features using a trained neural network; and
generating the one or more respective high resolution (HR) extended face areas based on a fusion of the respective facial details and one or more up-sampled respective decompressed low resolution (LR) extended face areas.

6. The method of claim 4, wherein the face reenactment technique comprises:
generating one or more respective intermediate representations based on the at least one respective decompressed reference low resolution (LR) extended face area and the one or more recovered facial features using a trained neural network; and
generating the one or more respective high resolution (HR) extended face areas based on up-sampling the one or more respective intermediate representations.

7. An apparatus for adaptive decoding of compressed video for video conferencing, the apparatus comprising:
at least one memory configured to store instructions;
at least one processor configured to execute the instructions, the instructions causes the at least one processor to:
receive compressed video data comprising a plurality of video frames;
determine a selection signal indicating whether at least one of a face restoration technique and a face reenactment technique is to be used, wherein the selection signal is based on a comparison of a first rate-distortion loss associated with a reconstructed extended face area reconstructed through face restoration and a second rate-distortion loss associated with the reconstructed extended face area reconstructed through face reenactment;
in response to determining that at least one of the face restoration technique and the face reenactment technique is to be used, select and transmit a single reference frame or a plurality of low resolution (LR) frames, the plurality of LR frames comprising only essential facial features;
generate one or more recovered facial features and one or more respective decompressed low resolution (LR) extended face areas based on the selection signal, the single reference frame or the plurality of low resolution (LR) frames, and the compressed video data; and
decode a video frame from the plurality of video frames based on the one or more recovered facial features and the one or more respective decompressed low resolution (LR) extended face areas.

8. The apparatus of claim 7, wherein the compressed video data comprises one or more compressed facial landmark features, compressed respective low resolution (LR) extended face areas, and the selection signal.

9. The apparatus of claim 7, wherein the generating the one or more recovered facial features and the one or more respective decompressed low resolution (LR) extended face areas comprises:
generating the one or more recovered facial features based on decompression of compressed facial landmark features; and
generating the one or more respective decompressed low resolution (LR) extended face areas based on decompression of compressed respective low resolution (LR) extended face areas.

10. The apparatus of claim 9, wherein the instructions further cause the at least one processor to:
generate, based on the selection signal indicating using the face restoration technique, one or more respective high resolution (HR) extended face areas using the face restoration technique and the one or more respective decompressed low resolution (LR) extended face areas; and
generate, based on the selection signal indicating using the face reenactment technique, one or more respective high resolution (HR) extended face areas using the face reenactment technique and the one or more respective decompressed low resolution (LR) extended face areas, wherein the one or more respective decompressed low resolution (LR) extended face areas includes at least one respective decompressed reference low resolution (LR) extended face area.

11. The apparatus of claim 10, wherein the face restoration technique comprises:
generating respective facial details corresponding to facial parts based on the one or more recovered facial features using a trained neural network; and
generating the one or more respective high resolution (HR) extended face areas based on a fusion of the respective facial details and one or more up-sampled respective decompressed low resolution (LR) extended face areas.

12. The apparatus of claim 10, wherein the face restoration technique comprises:
generating one or more respective intermediate representations based on the at least one respective decompressed reference low resolution (LR) extended face area and the one or more recovered facial features using a trained neural network; and
generating the one or more respective high resolution (HR) extended face areas based on up-sampling the one or more respective intermediate representations.

13. A non-transitory computer readable medium storing instructions that, when executed by at least one processor for adaptive decoding of compressed video for video conferencing, causes the at least one processor to:

receive compressed video data comprising a plurality of video frames;

determine a selection signal indicating whether at least one of a face restoration technique and a face reenactment technique is to be used, wherein the selection signal is based on a comparison of a first rate-distortion loss associated with a reconstructed extended face area reconstructed through face restoration and a second rate-distortion loss associated with the reconstructed extended face area reconstructed through face reenactment;

in response to determining that at least one of the face restoration technique and the face reenactment technique is to be used, select and transmit a single reference frame or a plurality of low resolution (LR) frames, the plurality of LR frames comprising only essential facial features;

generate one or more recovered facial features and one or more respective decompressed low resolution (LR) extended face areas based on the selection signal, the single reference frame or the plurality of low resolution (LR) frames, and the compressed video data; and decode a video frame from the plurality of video frames based on the one or more recovered facial features and the one or more respective decompressed low resolution (LR) extended face areas.

14. The non-transitory computer readable medium of claim 13, wherein the compressed video data comprises one or more compressed facial landmark features, compressed respective low resolution (LR) extended face areas, and the selection signal.

15. The non-transitory computer readable medium of claim 13, wherein the generating the one or more recovered facial features and the one or more respective decompressed low resolution (LR) extended face areas comprises:

generating the one or more recovered facial features based on decompression of compressed facial landmark features; and generating the one or more respective decompressed low resolution (LR) extended face areas based on decompression of compressed respective low resolution (LR) extended face areas.

16. The non-transitory computer readable medium of claim 15, wherein the instructions further include:

based on the selection signal indicating using the face restoration technique, generating one or more respective high resolution (HR) extended face areas using the face restoration technique and the one or more respective decompressed low resolution (LR) extended face areas; and based on the selection signal indicating using the face reenactment technique, generating one or more respective high resolution (HR) extended face areas using the face reenactment technique and the one or more respective decompressed low resolution (LR) extended face areas, wherein the one or more respective decompressed low resolution (LR) extended face areas includes at least one respective decompressed reference low resolution (LR) extended face area.

17. The non-transitory computer readable medium of claim 16, wherein the face restoration technique comprises:

generating respective facial details corresponding to facial parts based on the one or more recovered facial features using a trained neural network; and generating the one or more respective high resolution (HR) extended face areas based on a fusion of the respective facial details and one or more up-sampled respective decompressed low resolution (LR) extended face areas.

18. The non-transitory computer readable medium of claim 16, wherein the face reenactment technique comprises:

generating one or more respective intermediate representations based on the at least one respective decompressed reference low resolution (LR) extended face area and the one or more recovered facial features using a trained neural network; and generating the one or more respective high resolution (HR) extended face areas based on up-sampling the one or more respective intermediate representations.

\* \* \* \* \*